Nov. 20, 1956     J. M. TOLCHER     2,771,014
CAMERA HANDLE
Filed July 21, 1953

John M. Tolcher
INVENTOR.

BY *Clarence A. O'Brien
and Harvey B. Jacobson*
Attorneys

United States Patent Office 2,771,014
Patented Nov. 20, 1956

2,771,014

CAMERA HANDLE

John M. Tolcher, Denver, Colo.

Application July 21, 1953, Serial No. 369,491

3 Claims. (Cl. 95—86)

This invention relates in general to improvements in attachments for cameras, and more specifically to a handle for supporting a camera.

The primary object of this invention is to provide an improved handle for a camera which may be utilized in the supporting of cameras, such as movie cameras, by one hand in a relatively steady position.

Another object of this invention is to provide an improved camera handle which is of an extremely simple construction and which may be readily attached to conventional cameras for the convenient supporting of such a camera by one hand.

A further object of this invention is to provide an improved camera handle which includes a grip portion adapted to be held in one's hand and an arm rest adapted to engage one's arm, the camera handle having secured thereto a suitable mounting bracket for a camera whereby the camera may be conveniently supported with pressure being exerted on one's hand and wrist.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
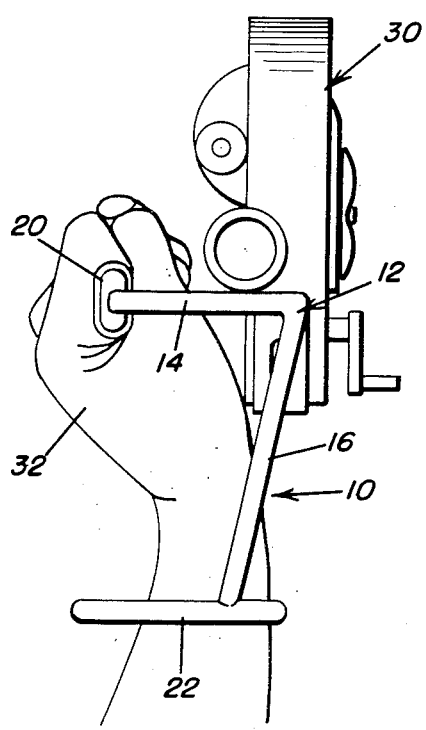
Figure 1 is an elevational view of a preferred form of camera handle and shows the same being utilized in the supporting of a movie camera.
Figure 2:
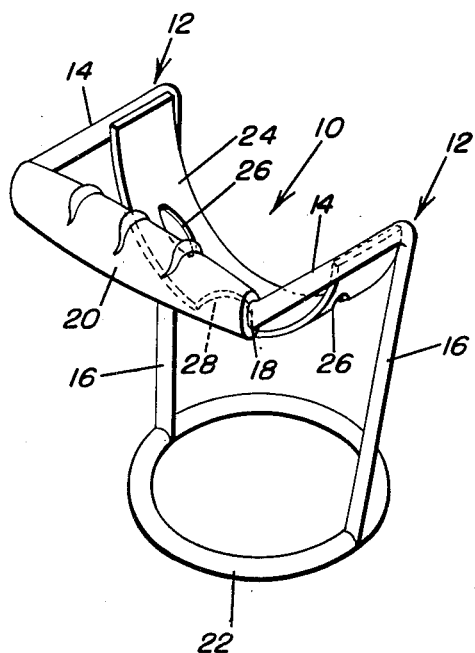
Figure 2 is a rotated perspective view of the camera handle of Figure 1 and shows the general construction thereof.

Referring now to Figures 1 and 2 in particular, it will be seen that there is illustrated a preferred form of camera handle, which is the subject of this invention, the camera handle being referred to in general by the reference numeral 10. The camera handle 10 includes a pair of Z-shaped frame members which are referred to in general by the reference numeral 12. The Z-shaped frame members 12 include inverted L-shaped frame members 12. The L-shaped frame members 12 include upper horizontal portions 14 and depending vertical portions 16. The horizontal portions 14 of the L-shaped frame members 12 are connected together by a bight portion 18, the L-shaped frame members 12 and the bight portion 18 being integral.

Carried by the bight portion 18 is a hand grip 20. The hand grip 20 is configurated for the convenient gripping thereof by one's hand in the manner best illustrated in Figure 1.

The lower ends of the L-shaped frame members 12 are secured to a ring 22. The ring 22 is intended to be received over one's wrist, as is best illustrated in Figure 1, and functions as an arm rest.

Extended between the horizontal portions 14 remote from the hand grip 20 is a generally U-shaped strap 24. The strap 24 has the ends thereof rigidly secured to the horizontal portions 14 and is provided intermediate its ends with suitable apertures 26 and 28 for facilitating the attachment of a camera, such as the movie camera 30 illustrated in Figure 1.

Referring now to Figure 1 in particular, it will be seen that the camera 30 may be conveniently supported through the use of a camera handle 10 by gripping the grip portion 20 with one's hand 32 with the wrist of that hand being passed through the ring 22 and the wrist engaging an inner surface thereof. By stiffening the wrist, the camera 30 may be conveniently positioned and rigidly supported.

Figures 3, 4:
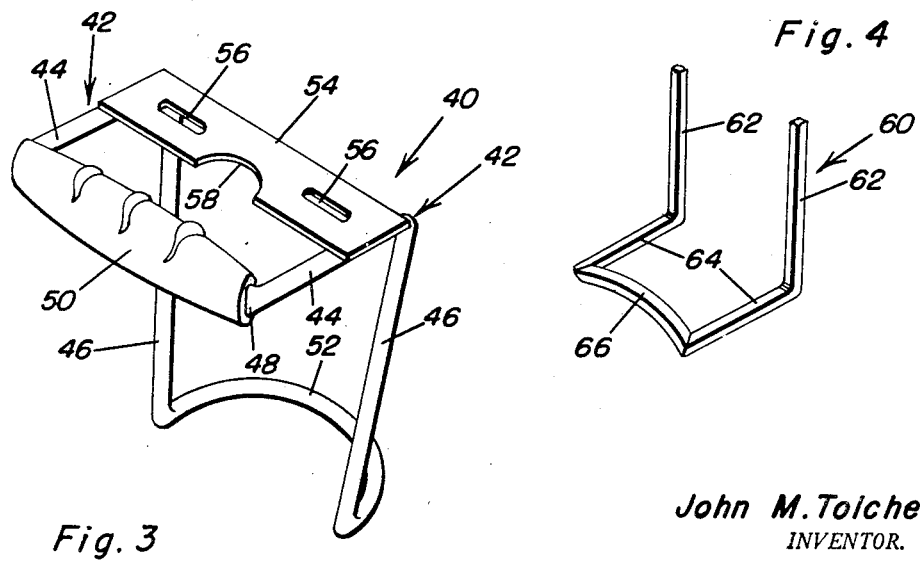
Figure 3 is a perspective view somewhat similar to Figure 2 of a slightly modified form of camera handle.
Figure 4 is a perspective view of a lower portion of a modified form of camera handle.

Referring now to Figure 3 in particular, it will be seen that there is illustrated a modified form of camera handle which is referred to in general by the reference numeral 40. The camera handle 40 includes a pair of inverted L-shaped frame members 42 which include horizontal upper portions 44 and depending vertical portions 46. The horizontal portions 44 are connected together by an integral bight portion 48 which has mounted thereon the hand grip 50. The lower ends of the vertical portions 46 are connected together by an arcuate member 52 which functions as an arm rest.

Extending between and rigidly secured to the horizontal portions 44 remote from the hand grip 50 is a camera mounting plate 54. The camera mounting plate 54 is provided with suitable apertures 56 and 58 to facilitate the reception of a camera.

It will be understood that the camera handle 40 is utilized in exactly the same manner as the camera handle 10. It will also be understood that the plate 50 is interchangeable with the plate 24.

Referring now to Figure 4 in particular, it will be seen that there is illustrated at the lower end of a still further modified form of camera handle, the camera handle being referred to in general by the reference numeral 60. The camera handle 60 includes vertically extending portions 62 of frame members, the vertically extending portions 62 corresponding to the portions 16 and 46 of the camera handles 10 and 40 respectively. Formed integrally with the lower ends of the vertical portions 62 and extending therefrom at right angles thereto are legs 64. The legs 64 have integrally connected to the other ends thereof an arcuate portion 66 which functions as an arm rest. It will be understood that the upper portion of the camera handle 60 will be identical either with the upper portion of the camera handle 10 or the camera handle 40 and a camera mounted thereon in the same manner illustrated at Figure 1.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A camera handle comprising a camera support plate on which the lower end of a camera is adapted to be secured, a horizontally disposed hand grip secured to said camera support plate and offset at one side of said camera support plate and a depending member secured to said camera support plate and having a curved lower portion adapted to engage the inner surface of the operator's forearm to steady the camera handle.

2. A camera handle comprising front and rear L-shaped members, each member including a horizontal portion and a depending portion, a camera support plate mounted on and connecting said horizontal portions adjacent their juncture with the depending portions, a horizontal hand grip connecting the outer ends of said horizontal portions whereby said hand grip is disposed in spaced relationship to said camera support plate and at one side thereof, and a curved member connecting the lower ends of said depending portions, said curved member adapted to engage the inner surface of the operator's forearm to steady the camera handle.

3. The structure as set forth in claim 2, wherein the curved member is formed as a ring which encircles the operator's forearm.

References Cited in the file of this patent

UNITED STATES PATENTS

| | | |
|---|---|---|
| 1,972,000 | Warner | Aug. 28, 1934 |
| 2,483,711 | Roos | Oct. 4, 1949 |

FOREIGN PATENTS

| | | |
|---|---|---|
| 441,148 | Germany | Feb. 21, 1927 |